Oct. 4, 1966 R. KREMP ETAL 3,276,341
FILM CARTRIDGE SUPPORT, PARTICULARLY FOR CAMERAS
Filed April 23, 1964
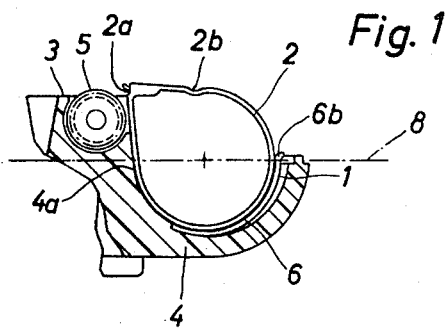
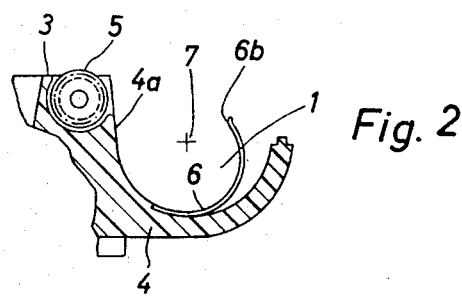
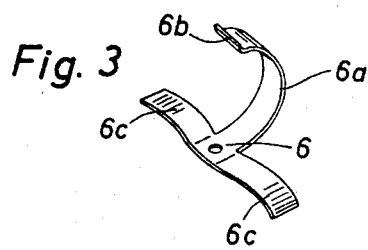
INVENTOR.
RUDOLF KREMP
ALFRED WINKLER
BY

United States Patent Office 3,276,341
Patented Oct. 4, 1966

3,276,341
FILM CARTRIDGE SUPPORT, PARTICULARLY FOR CAMERAS
Rudolf Kremp, Grunwald, near Munich, and Alfred Winkler, Munich, Germany, assignors to Agfa Aktiengesellschaft, Leverkusen, Germany, a corporation of Germany
Filed Apr. 23, 1964, Ser. No. 362,069
Claims priority, application Germany, Aug. 10, 1963, A 43,802
10 Claims. (Cl. 95—31)

The present invention relates to cameras.

More particularly, the present invention relates to camera structure for positioning in the camera a film cartridge of the type which houses coiled film which is not fixed on a rotary spool within the cartridge so that the film is withdrawn from the cartridge simply by being pulled therethrough and the cartridge is not supported in the camera by a structure similar to that which engages a rotary film spool. With structures of this type the film cartridge simply rests in a suitable cartridge chamber while film is pulled from the cartridge to expose the film.

It is known to provide cameras which are equipped to accept such cartridges with a tiltable film guiding channel member extending parallel to the cartridge and having its interior directed toward the cartridge chamber with one edge of the channel member engaging the mouth of the cartridge. Also, springs for engaging the coiled film are known.

Cartridges of this type, since they are not axially positioned by structure such as that which engages a film spool, simply remain loosely in the cartridge chamber, and as a result the sharply coiled film which is withdrawn from such a cartridge presses against the surface of the camera which is at the focal plane, for the purpose of positioning that part of the film strip which is to be exposed, and as a result of the resiliency of the film pressing against this surface the film itself, particularly when the camera is open, turns the cartridge away from the position in which it should remain during supply of the film from the cartridge to the focal plane of the camera. The result is that the mouth of the cartridge is displaced from its proper position directly next to the focal plane, and the threading of the film in the camera is difficult to carry out, while under certain circumstances proper positioning of the film flat in the focal plane cannot be guaranteed. Devices of the type referred to above, namely the tiltable film guiding channel member or the spring which directly engages the coiled film do not prevent turning of the cartridge by the curved film strip which projects from the cartridge, so that special holding devices, conventionally in the form of tiltable pressure members or the like must be provided for this purpose, and these holding devices are of considerable disadvantage because they are expensive to manufacture and assemble with the camera and because they make the camera inconvenient to operate.

It is accordingly a primary object of the present invention to overcome the above drawbacks by providing for a camera designed to use film cartridges of the above type a structure which will reliably hold the film cartridge in a proper position while at the same time being far simpler than heretofore known structures for this purpose as well as far more convenient to use.

In particular, it is an object of the invention to provide an exceedingly simple structure which will reliably hold a film cartridge of the above type in the cartridge chamber with the mouth of the film cartridge remaining reliably directly next to the focal plane.

Moreover, it is an object of the invention to provide an exceedingly simple and inexpensive structure which permits the cartridge to be introduced into and removed from the cartridge chamber without any inconvenience in a simple entirely obvious manner, so that the operator need not learn special techniques for introducing and removing such a cartridge.

With these objects in view the invention includes, in a camera, a wall means which has a first surface located at the focal plane to engage and position part of a film strip during exposure of this part of the film strip at the focal plane. This wall means of the invention defines a cartridge-receiving chamber, and the wall means includes a second surface located directly next to the first surface and forming part of the cartridge chamber. A spring means of the invention is carried by the wall means in the cartridge chamber and presses a cartridge which is situated in the chamber against the second surface of the wall means to hold the mouth of the cartridge, in a completely reliable manner, directly next to the first surface at the focal plane.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a transverse sectional fragmentary view illustrating the wall means of the invention and also showing the cross-sectional configuration of the cartridge chamber, FIG. 1 also illustrating a cartridge situated within the cartridge chamber;

FIG. 2 shows the structure of FIG. 1 with the cartridge removed; and

FIG. 3 is a perspective illustration of one possible embodiment of a spring means which forms part of the structure of the invention.

As may be seen from FIGS. 1 and 2, a wall means 4, forming a stationary structure at the interior of the camera housing, defines a cartridge chamber 1 which is adapted to receive the film cartridge 2 which is of the type in which a coil of film is situated without being mounted on a rotary film spool, the cartridge 2 having a mouth 2a through which the film strip is withdrawn from the cartridge. The wall means 4 has a first surface 3 located at the focal plane of the camera, surrounding the aperture through which the film is exposed, so that the inner periphery of the surface 3 determines the configuration and size of the exposed film frame, and the film strip which is withdrawn from the cartridge must lie flat against this surface 3 of the wall means 4 so as to be properly situated at the focal plane when the part of the film strip which engages the surface 3 is exposed.

The wall means 4 includes a second surface 4a located directly next to the first surface 3 and defining part of the cartridge chamber 1. In particular, this surface 4a conforms substantially to the configuration of that part of a conventional film cartridge 2 which is intended to and should engage the second surface 4a when the cartridge is properly positioned with its mouth 2a directly next to the focal plane, as indicated in FIG. 1. The wall means 4 also supports a film transporting means 5 with a portion thereof at the surface 3 adjacent to the surface 4a for engaging and transporting the film from the cartridge along the surface 3, and in the illustrated example this transporting means is in the form of a rotary sprocket member having sprockets which are adapted to be received in the perforations of the film.

The wall means 4 carries a spring means 6 which is situated at a part of the chamber 1 opposite from the surface 4a, and this spring means 6 is in the form of an elongated leaf spring member the left end of which, as viewed in FIGS. 1 and 2, is fixed to the wall means 4 so that the remainder of the elongated leaf spring can assume the position indicated in FIG. 2 when there is no cartridge in the cartridge chamber. As may be seen from FIG. 3, the leaf spring 6 includes the elongated curved arm 6a having a reversely curved free end portion 6b adapted to act as part of a detent structure for a purpose referred to below. It will be noted from FIG. 2 that in its unstressed position the arm 6a has a curvature sharper than the cross-sectional curvature of the cartridge 2. However, when the cartridge 2 is introduced into the cartridge chamber 1 the arm 6a conforms to the curvature of the cartridge 2, engages the latter over the entire area of the arm 6a, except for part of its end 6b, and in this way the spring means acts to press the cartridge 2 to the left, as viewed in FIG. 1, against the surface 4a. The spring means 6 can include, as shown in FIG. 3, in addition to the curved arm 6a a pair of additional arms 6c which extend longitudinally of the cartridge parallel to the axis 7 thereof and acting to press the cartridge toward the surface 4a and the end 6b of the spring.

The above-described structure of the invention operates in the following manner:

When the cartridge 2 is introduced into the chamber 1 between the surface 4a and the end 6b of the spring 6 in such a way that its mouth 2a is directed toward the focal plane, as illustrated in FIG. 1, the spring 6 presses the cartridge against the surface 4a and the unillustrated film strip which extends from the mouth 2a beyond the cartridge engages the surface 3. Inasmuch as the film is sharply coiled within the cartridge, the part of the film which engages the surface 3 seeks to displace the cartridge, in a clockwise direction, as viewed in FIG. 1, from the position in which the cartridge is initially placed by the operator, this position being shown in FIG. 1, and if the cartridge could be turned by the film in this way its mouth would be displaced from its position next to the focal plane. If such turning of the cartridge should occur, the possibility of maintaining the film flat against the surface 3 in the focal plane and proper transportation of the film would no longer be assured. However, the force of the pressure of the spring 6 and the direction of this pressure as well as the force of the friction between spring 6 and the cartridge are greater than any force which can be exerted by the film itself to displace the cartridge from the position shown in FIG. 1, by turning it in a clockwise direction, as viewed in FIG. 1, so that in this way such undesired turning is avoided.

Moreover, the operator is required only to withdraw a short length of film from the cartridge, the length of the film strip withdrawn initially from the cartridge only being required to be sufficiently great to enable the sprockets of the sprocket member 5 to be received in perforations of the film strip, and once the sprockets are received in the perforations the operator can close the camera. The film transporting structure is then actuated to advance the film between the surface 3 and the unillustrated pressure plate which urges the film against the surface 3, and in this way the leading end of the film is advanced toward the mouth of a second cartridge arranged symmetrically with respect to the supply cartridge on the other side of the exposure aperture so that the leading end of the film will automatically enter into this second cartridge to become automatically coiled therein. It is completely unnecessary for the operator to initially thread the leading end of the film strip into the empty cartridge which receives the exposed film, and in this way use can be made of the initial film portion for one or two additional photographs which ordinarily could not be made because a longer length of film would be required to be threaded initially while the camera is open. Furthermore, such threading operations are eliminated and the proper positioning of the film in the focal plane is assured. The unillustrated receiving cartridge which receives the exposed film is held in position with a structure symmetrical with that shown in FIGS. 1 and 2 and also including a spring 6 which is arranged symmetrically with respect to the spring 6 shown in FIGS. 1 and 2.

In order to remove the cartridge 2 the cartridge is rotated about the axis 7 by hand in a clockwise direction, as viewed in FIG. 1, so that the mouth 2a of the cartridge is advanced toward the end 6b of the spring in opposition to the force of the spring. In order to facilitate removal of the cartridge it is provided with a means which cooperates with the end 6b to limit the extent of turning of the cartridge relative to the spring, and in the illustrated example the wall of the cartridge which is substantially at the elevation of the surface 3 is formed with a detent recess 2b which receives the end 6b of the spring when the mouth 2a projects beyond the wall means 4, and this recess and spring end 6b form a detent structure which provides a pivot point about which the cartridge will turn during further movement of the cartridge by hand in the same direction of rotation. Instead of a recess 2b, the cartridge 2 can be provided with a projection which will engage the end of the spring arm 6a to limit the extent of turning of the cartridge relative to the spring and form a pivot axis about which the cartridge will turn so as to be easily removed from the chamber 1 by simple turning of the cartridge. As the cartridge turns about the tilting point provided by the detent structure 2b, 6b it becomes displaced out of the space between the surface 4a and the arm 6a.

As is apparent from FIG. 1, the cartridge 2 is curved so that at its right portion, as viewed in FIG. 1, it bulges away from the surface 3, and the spring 6 extends beyond the point where the cartridge 2 bulges to the greatest extent from the surface 3 by a relatively small distance, which may be on the order of 2 mm., so that in this way the spring 6 will on the one hand reliably hold the cartridge in the position shown in FIG. 1 while on the other hand the cartridge is very easy to remove. It will be seen that this line of greatest bulging from the surface 3 is substantially at the elevation of the central axis 7 of the cartridge, and the end 6b extends, as shown in FIG. 1, only to a very slight extent upwardly beyond the elevation of the central axis of the cartridge.

The invention is not limited to the specific details described above and shown in the drawing. For example, the film transporting means 5 can be situated on the other side of the exposure aperture, and such an arrangement may be of advantage when the film instead of being fed into a cartridge similar to cartridge 2 for receiving the exposed film is located in a double cassette having at its ends, as is well known, a pair of film chambers. Moreover, the size of the chamber 1 and the point at which the spring 6 is fixed to the wall means 4 can be such that the arms 6c can be eliminated.

It will be understood that each of the elements described above, or two or more together, may also find a useful application in other types of cameras differing from the types described above.

While the invention has been illustrated and described as embodied in cartridges, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, wall means having a first surface located in the focal plane for positioning part of a film strip engaging said first surface in the focal plane during exposure of said part of the film strip, said wall means defining a cartridge chamber for receiving a cartridge from which the film strip projects and said wall means having next to said first surface a second surface forming part of said chamber; and spring means carried by said wall means in said chamber for engaging a cartridge and pressing it against said second surface as soon as the cartridge is inserted into said chamber.

2. In a camera, in combination, wall means having a first surface located in the focal plane for positioning part of a film strip engaging said first surface in the focal plane during exposure of said part of the film strip, said wall means defining a chamber for receiving a film cartridge and said wall means having a second surface next to said first surface, forming part of said chamber, and conforming to the configuration of the film cartridge at a portion thereof located next to said first surface when said cartridge is in said chamber; and spring means carried by said wall means in said chamber for engaging a film cartridge and urging it against said second surface as soon as the cartridge is inserted into said chamber.

3. In a camera, in combination, wall means having a first surface located in the focal plane for positioning part of a film strip engaging said first surface in the focal plane during exposure of said part of the film strip, said wall means defining a cartridge chamber for receiving a cartridge from which the film strip projects and said wall means having next to said first surface having a portion located in a plane transverse to said first surface and a second surface forming part of said chamber; and spring means carried by said wall means in said chamber for engaging a cartridge and pressing it against said portion of said second surface as soon the cartridge is inserted into said chamber, said spring means being a leaf spring which is adapted to extend part of the way around a film cartridge and which when it engages the film cartridge conforms to the curvature thereof.

4. In a camera, in combination, wall means having a first surface located in the focal plane for positioning part of a film strip engaging said first surface in the focal plane during exposure of said part of the film strip, said wall means defining a cartridge chamber for receiving a cartridge from which the film strip projects and said wall means having next to said first surface a second surface forming part of said chamber; and spring means carried by said wall means in said chamber for engaging a cartridge and pressing it against said second surface as soon as the cartridge is inserted into said chamber, said spring means exerting a predetermined force and having with respect to a cartridge which it engages a given force of friction, and the sum of both of said forces being greater than the force with which a film strip engaging said first surface tends to turn the cartridge, so that when the mouth of the cartridge, through which the film strip extends between the interior and exterior of the cartridge, has a position located next to said first surface at the junction between the latter and said second surface, said mouth cannot be turned by the film strip itself away from said position.

5. In a camera, in combination, wall means having a first surface located at the focal plane for positioning part of a film strip which engages said first surface in the focal plane during exposure of said part of the film strip, said wall means defining a cartridge chamber for receiving a film cartridge from which the film strip extends, and said wall means having next to said first surface a second surface forming part of said chamber and adapted to be engaged by the film cartridge; a leaf spring carried by said wall means in said chamber thereof and having a curvature which places said leaf spring in a position extending part of the way around a cartridge in said chamber, said leaf spring having a free end portion of predetermined curvature and said cartridge having a means displaceable together with said cartridge into engagement with said free end portion of said leaf spring, to thereby prevent movement of said said means along said leaf spring beyond said free end portion thereof, so as to facilitate removal of a cartridge from said chamber.

6. In a camera, in combination, wall means having a first surface located in the focal plane for positioning a part of a film strip which engages said first surface in the focal plane during exposure of said part of the film strip, said wall means defining a cartridge chamber for receiving a film cartridge which bulges away from said first surface, said wall means having a second surface next to said first surface and forming part of said chamber; and a leaf spring carried by said wall means in said chamber, extending partly around a cartridge therein for urging the cartridge against said second surface as soon as the cartridge is inserted into said chamber, and said leaf spring extending only to a slight extent beyond the part of said cartridge which bulges to the greatest extent away from said first surface.

7. In a camera, in combination, wall means having a first surface located in the focal plane for positioning part of a film strip which engages said first surface in the focal plane during exposure of said part of the film strip, said wall means defining a cartridge-receiving chamber for receiving a film cartridge from which the film strip extends and adapted to be positioned in the chamber with the mouth of the cartridge adjacent said first surface, said wall means having next to said first surface a second surface forming part of said chamber and engaged by the film cartridge; and a leaf spring having one leg extending partly around the cartridge to urge the latter toward said second surface as soon as the cartridge is inserted into said chamber and having a second leg extending longitudinally of the film cartridge.

8. In a camera, in combination, wall means having a first surface located in the focal plane for positioning part of a film strip engaging said first surface in the focal plane during exposure of said part of the film strip, said film strip extending from a film cartridge and said wall means defining a chamber for receiving said cartridge, said wall means having a second surface defining part of said chamber and located next to said first surface; spring means carried by said wall means in said chamber for engaging a cartridge to urge the latter toward said second surface as soon as the cartridge is inserted into said chamber; and film transporting means carried by said wall means at a location where part of said film transporting means is at said first surface at a region thereof which is adjacent said second surface.

9. In a camera as recited in claim 8 said film transporting means being a rotary sprocket roller having sprocket teeth which are adapted to be received in perforations of the film strip.

10. In a camera, in combination, wall means having a first surface located at the focal plane for positioning part of a film strip which engages said first surface in the focal plane during exposure of said part of the film strip, said wall means defining a cartridge chamber for receiving a film cartridge from which the film strip extends, and said wall means having next to said first surface a second surface forming part of said chamber and adapted to be engaged by the film cartridge; a leaf spring carried by said wall means in said chamber thereof and having a curvature which places said leaf spring in a position extending part of the way around a cartridge in said chamber, said leaf spring having a free end portion of predetermined curvature and said cartridge having a means displaceable together with said cartridge into engagement with said free end portion of said leaf spring to thereby prevent movement of said means along said leaf spring beyond said free end portion thereof, so as to facilitate removal of a cartridge from said chamber, said means of said cartridge being in the form of a detent recess at the exterior of the cartridge and said free end portion of said leaf spring having a curvature which introduces said free end portion into said detent recess so that the latter and said free end portion of said leaf spring form a pivot about which the cartridge can be turned relative to the leaf spring to be displaced out of said chamber.

References Cited by the Examiner

UNITED STATES PATENTS 3,212,421  10/1965  Hackenberg _____ 95—31

FOREIGN PATENTS 800,938  12/1950  Germany.
866,600  6/1953  Germany.

NORTON ANSHER, *Primary Examiner.*

V. A. SMITH, *Assistant Examiner.*